United States Patent [19]  [11] 3,940,359
Chambers  [45] Feb. 24, 1976

[54] SOIL-REPELLENT COATING COMPOSITIONS

[75] Inventor: William John Chambers, Wilmington, Del.

[73] Assignee: E. I. Du Pont de Nemours and Company, Wilmington, Del.

[22] Filed: May 8, 1974

[21] Appl. No.: 468,199

[52] U.S. Cl.. 260/29.6 F; 260/29.6 MM; 260/42.27
[51] Int. Cl.² ......................................... C08L 27/12
[58] Field of Search ........... 260/29.6 F, 42.27, 92.1, 260/29.6 MM

[56] References Cited
UNITED STATES PATENTS

| | | | |
|---|---|---|---|
| 2,549,935 | 4/1951 | Sauer | 260/29.6 |
| 2,562,117 | 7/1951 | Osdal | 260/29.6 |
| 2,592,147 | 4/1952 | Ikeda | 260/29.6 |
| 2,991,277 | 7/1961 | Schildknecht | 260/29.6 |
| 3,102,103 | 8/1963 | Albrecht | 260/29.6 |
| 3,356,628 | 12/1967 | Smith et al. | 260/29.6 |
| 3,489,595 | 1/1970 | Brown, Jr. | 260/29.6 |
| 3,645,989 | 2/1972 | Tandy, Jr. | 260/29.6 |
| 3,655,604 | 4/1972 | Strolle | 260/29.6 |
| 3,684,755 | 8/1972 | Gumerman | 260/29.6 |

*Primary Examiner*—Eugene C. Rzucidlo

[57] ABSTRACT

Aqueous dispersions are disclosed containing up to 50% of particulate solids having a particle size less than $1\mu$ and consisting essentially of a. 4 parts by weight of particles of hydrous metal oxides such as silica, alumina or aluminum-modified silica, and b. from 1 to 16 parts by weight of particles of a polymer containing from 0.5% to 92% by weight of —$CF_3$ groups, and preferably having a Knoop hardness of at least 5.

The dispersions can be used to coat fabrics, painted surfaces and the like to enhance soil repellancy.

8 Claims, No Drawings

SOIL-REPELLENT COATING COMPOSITIONS

BACKGROUND OF THE INVENTION

This invention relates to coating compositions containing hydrous metal oxides and $-CF_3$ containing polymers in aqueous dispersions which can be applied to surfaces to minimize soil and facilitate release of any adherent soil.

DESCRIPTION OF THE PRIOR ART

Aqueous dispersions of inorganic colloids such as silica gel have been suggested in U.S. Pat. No. 2,622,307 as a coating that reduces the tendency of pile fabrics to become permanently soiled. Mixtures of hydrous oxides have also been used in U.S. Pat. No. 2,734,835. A combination of a hydrous oxide sol and polytetrafluoroethylene has been described in U.S. Pat. No. 2,592,147 as useful for abrasion resistant coatings. The latter polymer has $(CF_2)$ groups but not the $CF_3$ group. Coatings on painted surfaces of this combination have been found to have poor cleanability and dirt release properties.

SUMMARY OF THE INVENTION

The present invention comprises aqueous dispersions, containing up to 50% by weight of solid particles having a size less than $1\mu$ and consisting essentially of
a. 4 parts by weight of hydrous metal oxide particles preferably selected from silica fibrous alumina or aluminum-modified silica;
b. 1 to 16 parts by weight of particles of a polymer containing $-CF_3$ groups 0.5% to 92% by weight, and preferably about 3% to about 60% by weight of said polymer.

The composition may contain a surfactant to stabilize the dispersion, which may be anionic, cationic or nonionic.

Preferably, the dispersions are acidic, i.e., having a pH less than 7.

For application as coatings, the preferred solids content is between about ½ and about 10% by weight.

DETAILED DESCRIPTION OF THE INVENTION

The essential features of the composition of the present invention is the combination of polymer containing $-CF_3$ groups with hydrous metal oxides to provide soil repellent coatings.

The presence of $-CF_3$ groups appears to be a specific requirement. Fluorinated polymers which do not contain substantial $-CF_3$ content are not effective as noted heretofore, even where fluorine comprises the greater part of the polymer. On the other hand, relatively small amounts (0.5% by weight of $-CF_3$) are effective; moreover, the type of polymer containing the $-CF_3$ groups can vary widely.

The polymer can be homopolymer or a copolymer of one or more $-CF_3$ bearing monomers obtainably with one or more other monomers.

The preferred monomers containing $-CF_3$ groups are esters of acrylic acid or methacrylic acid with fluorinated alcohols, containing from 2 to 12 carbon atoms and having from 1 to 3 $-CF_3$ groups. 1,1,1,3,3,3-Hexafluoroisopropyl methyl methacrylate is particularly preferred.

Other suitable monomers include vinyl ether monomers containing $-CH_2$ groups such as trifluoromethyl vinyl ether and perfluoropropyl perfluorovinyl ether, styrene and its derivative substituted with trifluoromethyl groups such as p and m-trifluoromethyl styrene, perfluoro (2-methylene-4-methyl-1,3-dioxolane), hexafluoropropylene and the like, and generally contain up to 18 carbon atoms.

Suitable comonomers include the alpha-olefins especially ethylene, and propylene, the acrylates including acrylic acid, methacrylic acid, methyl acrylate, methyl methacrylate, cyclohexyl methacrylate, 2-hydroxy ethyl methacrylate, 2-ethoxyethyl methacrylate, methyl ethacrylate and the like, acrylonitrile, styrene, alpha-methyl styrene, methyl vinyl ether, tetrafluoroethylene, chlorotrifluoroethylene, vinyl chloride, vinyl fluoride, vinylene fluoride, vinyl acetate, vinyl butyrate, N,N-dimethyl methacrylamide, N-vinyl carbazole, diethyl itaconate, maleic anhydride, and the like.

The copolymers may be modified, e.g., by hydrolysis of acetate groups after polymerization to yield polymers of vinyl alcohol, etc.

The particular formulation selected depends on many factors, including cost. Generally, formulations which can be readily polymerized in aqueous system and which employ normally liquid or solid, water-dispersible monomers are preferred. Particularly, preferred formulations yield solid copolymers which have a Knoop hardness above about 5. Oxygen-containing monomers such as the acrylates or methacrylates generally satisfy this requirement.

The following table shows the Knoop hardness (25°C) of representative trifluoromethyl-containing polymers

| Polymer | Hardness |
|---|---|
| $CH_2=C(CH_3)COOCH(CF_3)_2$ | 11.50 |
| $CH_2=C(CH_3)COOCH(CF_3)_2/CH_2=C(CH_3)COOCH_2CH_2OH$ (95/5) | 8.17 |
| $CH_2=C(CH_3)COOCH(CF_3)_2/CH_2=C(CH_3)COOCH_3/CH_2=C(CH_3)COOH$ (10/85/5) | 27.24 |
| $CH_2=C(CH_3)COO(CH_2)_2(CF_2)_5.7CF_3/CH_2=C(CH_3)COOCH_3$ (80/20 molar %) | 6.25 |
| $CF_2=C\underset{O-CF-CF_3}{\overset{O-CF_2}{\diagdown\!\!\!\diagup}}/CF_2=CH_2$ (75/25 molar %) | 18.29 |

In contrast to the above tetrafluoroethylene polymer has a value of 2.20.

The polymerization, including copolymerization, can be effected by standard procedures used with vinyl-type monomers to give solid polymers of relatively high molecular weight. Preferred are free-radical catalysts used in an aqueous system with added dispersants to produce stable dispersions of the polymer. For purpose of identification the polymers can be isolated to generally provide tough, clear and colorless films. It is preferred that stable dispersions of the polymer (suitably of 10–25% polymer) be prepared and used directly with the metal oxide sol dispersion. The inherent viscosity of the polymers is generally 0.1 to 1.0.

The second component of the composition is a dispersion of fibrous alumina, silica or aluminum-modified silica. Such dispersions are articles of commerce, e.g., "Ludox" 130 M, an alumina modified silica containing 30% solids positively charged; "Ludox" AM, aluminum modified silica containing 30% solids, negatively charged; fibrous alumina (AL) (7.2% solids) and the like such as described in U.S. Pat. Nos. 2,590,833, 3,007,878, 3,620,978, and 3,657,003. The liquid metal oxide dispersion is mixed with the polymer dispersion to provide a solids ratio of from four parts polymer to one part hydrous metal oxide to one part polymer to four parts hydrous metal oxide.

Although any dispersible hydrous metal oxide can be employed, it is generally preferred to use those which are substantially colorless except where colored sols can contribute to protection from adverse effects of light. Particularly useful are positively charged hydrous metal oxide sols and negatively charged hydrous metal oxide sols.

For shipping and storage, concentrates may be employed containing up to 50% by weight of solids. However, for use as coating, the dispersions preferably contain from about 0.5% to 10% by weight of solids.

The coatings may be employed to protect a wide variety of substrates, including textiles, films, cloth, carpeting, painted surfaces on wood or metal, glass, plastic surfaces including clear plastic articles such as methylmethacrylate or polycarbonate sheeting, paper, cardboard, leather, or the like. The coating can be applied by wiping, doctoring, spraying or otherwise covering the surface to be protected with the dispersion followed by air drying. With suitable substrates, improved results can often be achieved by baking the coated article after drying. Preferably sufficient material should be applied to deposit a coating having a thickness of 0.1 to 5$\mu$.

SPECIFIC EMBODIMENTS

This invention is further illustrated by the following specific embodiments in which parts are by weight unless otherwise specified.

A. Preparation of Polymer Dispersions

The polymer dispersions were prepared by the following method using the monomers and dispersants given in Table I.

Dry nitrogen gas was bubbled through 100 ml of distilled water in a 250 ml three-neck flask equipped with stirrer and thermometer for ten min. at 24°–26°C. The nitrogen bubbler was replaced with a condenser equipped to maintain a nitrogen atmosphere over the reaction. To the water was added 0.60 g of dispersant and the mixture was stirred 2 min. Then 20 g of monomer was added and the mixture was stirred 5 min. To this emulsion was added 0.0040 g ammonium persulfate. The reaction mixture was heated at reflux for 30 min. The reflux temperature gradually rose from initial temperatures of 80°–90°C to near 100°C as monomer was consumed and the reflux temperature approached the boiling point of water. Any residual monomer was removed by a short azeotropic distillation. Agglomerated polymer in the polymer dispersion was removed by passing the polymer dispersion through a medium fritted glass filter. The resulting polymer dispersions ranged from transparent to white opaque dispersions that exhibited little or no settling of polymer particles in 30 days.

The dispersion solids content was determined by drying a 1.000 g dispersion sample 24 hours under 15 in. of vacuum at 50°C under a low dry nitrogen flow. The resulting solid was weighed after cooling. The pH was measured with a pH meter.

TABLE I

Preparation of Polymer Dispersions

| No. | Dispersant g | Grams of Monomers HIM, g | Others, g | Solids Content % | pH | —CF$_3$ Wt% |
|---|---|---|---|---|---|---|
| A | 0.4 DuMe | 21.5 | — | 17.5 | 6.4 | 58.5 |
| B | 0.6 DuMe | 18.0 | 2.0 HEMA | 16.6 | 4.1 | 52.6 |
| C | 0.6 DuMe | 18.0 | 2.0 EEMA | 19.1 | 4.1 | 52.6 |
| D | 0.6 DuMe | 19.0 | 1.0 HEMA | 16.6 | 4.4 | 55.6 |
| E | 0.6 FC170 | 18.0 | 2.0 MMA | 15.6 | 3.1 | 52.6 |
| F | 0.8 FC170 | 19.6 | 0.4 MAA | 13.6 | 3.0 | 57.3 |
| G | 0.6 HDPC | 19.0 | 1.0 HEMA | 15.1 | 2.8 | 55.6 |
| H | 0.6 HDTB | 18.0 | 2.0 MAA | 14.0 | 2.1 | 52.6 |
| I | 0.6 HDTB | 19.0 | 1.0 MAA | 13.2 | 2.1 | 55.6 |
| J-1 | 0.6 HDPC | 18.0 | 2.0 HEMA | 15.8 | 2.8 | 52.6 |
| J-2 | 0.6 HDPC | 19.0 | 1.0 HEMA | 15.1 | 2.7 | 55.6 |
| K | 0.6 HDPC | 19.6 | 0.4 HEMA | 14.7 | 2.6 | 57.3 |
| L | 0.6 DuMe | 18.0 | 2.0 EEMA | 14.9 | 4.6 | 52.6 |
| M | 0.6 DuMe | 19.0 | 1.0 EEMA | 15.4 | 4.3 | 55.6 |
| N | 0.6 HDTB | 16.0 | 3.0 MMA, 1.0 MAA | 15.6 | 2.3 | 46.8 |
| O | 0.6 HDTB | 3.0 | 16.0 MMA, 1.0 MAA | 17.7 | 3.0 | 8.8 |
| P | 0.6 HDPC | 16.0 | 3.0 MMA, 1.0 HEMA | 16.5 | 2.9 | 46.8 |
| Q | 0.6 HDPC | 3.0 | 16.0 MMA, 1.0 HEMA | 18.2 | 3.6 | 8.8 |
| R | 0.6 DuMe | 19.0 | 1.0 DAA | 15.6 | 6.1 | 55.6 |
| S | 0.6 DuMe | 19.0 | 1.0 VC | 14.9 | 4.6 | 55.6 |
| T | 0.6 DuMe | 19.0 | 1.0 CMA | 15.4 | 4.2 | 55.6 |
| U | 0.6 HDTB | 3.0 | 16.0 MMA, 1.0 MAA | 17.3 | 2.8 | 8.8 |
| V | 0.6 HDTB | — | 20.0 TFMS | 15.5 | 3.9 | 40.4 |
| W | 0.6 HDPC | 1.0 | 18.0 MMA 1.0 HEMA | 17.0 | 3.7 | 2.9 |
| X | 0.6 HDPC | 1.0 | 18.0 MMA, 1.0 MAA | 17.0 | 2.8 | 2.9 |
| Y | 0.6 HDPC | — | 3.0 TEM, 16.0 MMA, 1.0 MAA | 17.3 | 2.6 | 6.0 |
| Z | 0.6 HDPC | 3.0 | 16.0 MMA 1.0 MAA | 16.9 | 2.7 | 8.8 |

ABBREVIATIONS

Monomers and Polymers

| | |
|---|---|
| HIM | Hexafluoroisopropyl methacrylate |
| HEMA | 2-Hydroxyethyl methacrylate |
| EEMA | 2-Ethoxyethyl methacrylate |
| MAA | Methacrylic Acid |
| MMA | Methyl methacrylate |
| DAA | N,N-Dimethyl methacrylamide |
| VC | N-Vinyl carbazole |
| CMA | Cyclohexyl methacrylate |
| TFMS | m-Trifluoromethyl styrene |
| TEM | 2,2,2-Trifluoroethyl methacrylate |

Surfactants

| | |
|---|---|
| DuMe | Sodium lauryl sulfate |
| FC-170 | 3M "nonionic fluorochemical surfactant" |
| HDPC | Hexadecyl pyridinium chloride |
| HDTB | Hexadecyl trimethylammonium bromide |

General Method for Preparing Coating Formulations

Formulations were prepared by mixing a weighed amount of distilled water and dilute surfactant solution, when used. This solution was mixed with a weighed amount of polymer dispersion. Then a weighed amount of inorganic sol was mixed to give the coating formulation.

General Method for Applying Coatings

The coatings were applied to substrates by wiping with a cloth wiper, a sponge or drawn down with a round rod. After application, the coating was allowed to air dry at 24°–26°C. Some coatings were baked (after air drying) at 120°–150°C for about 5 min.

Coating Evaluations

One evaluation (RD) involved shaking the panels with dry road dust. Road dust was obtained along a busy highway. It was dried and screened to –40 mesh and –80 mesh. The panels were compared visually for dust retention.

A second evaluation consisted of spraying the panels with a water slurry of road dirt, allowing the slurry to dry. The panels with dried road dirt slurry were then rinsed under a cold water tap for 60 sec. No rubbing or abrading was employed. After drying, the panels were rated for dirt retention. This evaluation is identified by the letters CW.

A third evaluation consisted of testing panels with dried road dirt on them by soaking in detergent solution 1–5 min. followed by rinsing under cold water tap. No rubbing or abrading was used. After drying, the panel was rated for dirt retention. This evaluation is identified by the letters SW. In some cases yard dirt containing clay (YD) or air cleaner test dirt (AC) were also used in dry dust tests.

Ratings

The dirt retention was judged subjectively, with samples in a given experiment being ranked relative to each other. After relative ranking of samples, ratings from 10 (equal to no dirt adhered) and 5 (equal to half covered with dirt) to 0 (equal to completely covered with dirt). Thus, 10 would be equivalent to excellent dirt repellency in RD test and equivalent to excellent cleanability in CW and SW evaluations. On the other hand a rating of 0 would be equivalent to little or no dirt repellency in RD evaluations and little or no cleanability in the CW and SW evaluations.

EXAMPLE 1

A coating formulation was prepared by mixing 6 ml of polymer dispersion "B", 4 ml of "Ludox" 130M (30% solids, aluminum modified silica, positively charged), 10 ml of distilled water and 25 drops of n-butanol. The formulation was coated on Lucite organosol automotive finish. The automotive finish was a steel substrate. The coating formulation was baked 5 min. at 160°C. After cooling the panel was shaken with dry road dirt and rated as described above.

| | Rating |
|---|---|
| Coated panel | 9 |
| Uncoated panel | 1 |

As shown by the rating, the coating gave excellent dirt repellency.

EXAMPLE 2

Another coating formulation was prepared by mixing 8.377 g of water, 0.311 g of polymer dispersion "B", 0.333 g of Ludox AM (30% solids, silica, negatively charged), 1 ml of dimethylformamide and 0.02 g of ammonium salt of ω-hydrooctafluorononanoic acid. The formula was used to coat one-half of a Lucite automotive finish panel as in the previous example. The coated sample was shaken with road dust and evaluated.

| | Rating |
|---|---|
| Coated portion | 9–10 |
| Uncoated portion | 0–1 |

Thus, this coating functions as an excellent dirt repellent coating.

The following Examples specifically illustrate some of the coating formulations prepared. Most of the polymer dispersions were employed in the preparation of coating compositions containing 0.1% surfactant and solid contents of polymer to sol in percentages of 4/1, 2/1, 1/2, 1/4 and 4/4 using polymer emulsions that contained generally about 16% solids and either silica sol of 30% solids or alumina sol of about 7% solids.

To reduce variability in tests a large group of various dust repellent coatings were coated on panels at the same time. After drying each set of panels in the same way, the set was evaluated for dust repellency or dried wet dirt slurry cleanability on the same day. Coatings are rated relative to each other with the best first.

EXAMPLE 3

Poly(methyl methacrylate) panels 4 × 4 × 1/4 inch, were cleaned with isopropyl alcohol and then a band 1″ wide was coated on each side of the panel. Coating formulations prepared as described above were used. The panels were air dried. Panels were evaluated for dust repellency by pouring dust on the panel tilted at 45° from vertical. Both road dirt (RD) and vacuum cleaner (VC) dirt were used in separate tests. Some coatings giving good to excellent dust repellency are listed below (Table II).

TABLE II

| Polymer | COATING FORMULATION | | | | | Dirt Repellency Rating* | |
|---|---|---|---|---|---|---|---|
| | g | Water g | Surfactant (1%) | Sol (g) | | Vacuum Cleaner | Road Dirt |
| "J-2" | 3.315 | 4.025 | 1 HDPC | 1.695 | 130M | 10 (0) | 8 (4) |
| "P" | 0.612 | 7.725 | 1 HDPC | 0.666 | " | 9 (0) | 9 (4) |
| "O" | 0.570 | 7.102 | 1 HDTB | 1.365 | " | 7 (0) | 10 (4) |
| "O" | 2.263 | 5.407 | 1 HDTB | 1.333 | " | 7 (0) | 10 (4) |
| "J-1" | 2.532 | 5.137 | 1 HDPC | 1.349 | " | 8 (0) | 9 (5) |
| "P" | 1.240 | 7.456 | 1 HDPC | 0.344 | " | 8 (0) | 9 (4) |
| "O" | 0.584 | 7.772 | 1 HDTB | 0.673 | " | 8 (0) | 9 (4) |
| "Q" | 2.212 | 5.540 | 1 HDTB | 1.376 | " | 7 (0) | 9 (4) |

*Ratings in parentheses are for uncoated polymethymethacrylate.

EXAMPLE 4

Comparison of Polymer, Inorganic Sol and Polymer-Inorganic Sol Coatings

The following coating compositions were prepared and evaluated.

a.

1.008 g 1% HDTB solution
6.732 g distilled water
2.263 g polymer dispersion (Example "O")

b.

1.000 g 1% HDTB solution
7.667 g distilled water
1.341 g Ludox 130M c.

1.000 g 1% HDTB solution
5.431 g distilled water
2.259 g polymer dispersion (Example "O")
1.343 g Ludox 130M The compositions were coated on glass and on Lucite auto finish substrates. After air drying the coatings were baked 5 min. at 120°C. The coatings were evaluated for dust repellency. The coatings on Lucite were also evaluated for cleanability.

| | Coatings on Lucite Substrate Evaluation Rating* | | | Coatings on Glass Substrate Evaluation Rating* |
|---|---|---|---|---|
| | RD | CW | SW | RD |
| (a) | 2 (3) | 2 (1) | 7 (5) | 7 (3) |
| (b) | 6 (3) | 4 (3) | 5 (4) | 6 (3) |
| (c) | 10 (3) | 8 (2) | 9 (5) | 9 (3) |

Although coatings of polymer dispersion alone and of Positive Sol 130M alone give some dust repellency, the combination of polymer dispersion with Ludox 130M gave superior dust repellency and cleanability.

EXAMPLE 5

A coating formulation was prepared from the following components (mixed in the order listed):
81.02 g distilled water
5.65 g polymer dispersion (Example "O")
3.33 g Ludox 130M (See Example 1)
1.00 g wetting solution containing 5% albumin
9.00 g distilled water
After mixing the solids remained in suspension.

Half of a previously cleaned station wagon rear window was coated by wiping the glass with a roll of paper towel wetted by the formulation. The coating was allowed to dry at ambient temperature. The coated portion of the window showed lower reflectivity (than the uncoated portion) thus improving the visibility through the window. After 30 days, the car was driven through a dry dusty field. The dust was a reddish clay-like soil. The coated portion of the rear window showed very little dust pickup (a rating of about 8) while the uncoated glass picked up enough dust to obscure vision (a rating of about 2). The polymer-sol coating is an effective dust repellent.

EXAMPLE 6

To further illustrate coating formulations, the following dispersions each containing 1 g of 1% aqueous HDTB dispersant and varying amounts in g of water, polymer "U" from Table I, and Ludox 130M (30% solids) or fibrous alumina (AL) (7.2% solids).

| No. | Water | Polymer Emulsion | Sol | |
|---|---|---|---|---|
| 1 | 6.355 | 2.312 | 0.364 | (130 M) |
| 2 | 7.511 | 1.162 | 0.335 | " |
| 3 | 7.756 | 0.580 | 0.666 | " |
| 4 | 7.089 | 0.578 | 1.335 | " |
| 5 | 5.356 | 2.312 | 1.345 | " |
| 6 | 5.350 | 2.267 | 1.390 | AL |
| 7 | 6.485 | 1.143 | 1.415 | " |
| 8 | 5.655 | 0.565 | 2.780 | " |
| 9 | 2.877 | 0.591 | 5.583 | " |
| 10 | 1.080 | 2.265 | 5.5 | " |

These were tested by coatings on a Lucite automotive finish panel, air dried and then baked (5 min. at 160°C). The panel was shaken with dirt using hydrophobic road dust, "RD"; hydrophilic clay soil yard dirt "YD"; and hydrophilic air cleaner test dust "AC".

TABLE III

| | RD | CW | SW | AC | YD |
|---|---|---|---|---|---|
| 1 | 9 (1) | 7 (2) | 9 (6) | not tested | not tested |
| 2 | 9 (1) | 7 (2) | 9 (5) | " | " |
| 3 | 7 (1) | 5 (2) | 7 (5) | " | " |
| 4 | 8 (1) | 5 (2) | 7 (5) | " | " |
| 5 | 9 (1) | 8 (3) | 9 (6) | " | " |
| 6 | 8 | 8 (2) | 10 (9) | 10 (0) | 8 (3) |
| 7 | 9 | 9 (2) | 10 (10) | 9 (0) | 9 (3) |
| 8 | 9 | 3 (5) | 3 (7) | 9 (0) | 9 (4) |
| 9 | 9 | 1 (4) | 1 (9) | 9 (0) | 9 (3) |
| 10 | 9 | 4 (2) | 5 (8) | 9 (0) | 9 (3) |

EXAMPLE 7

Coating formulations were prepared from 1% hexadecyl pyridinium chloride, 30% solids Ludox 130M and an aqueous dispersion of the copolymer $F_3CCF_2(CF_2CF_2)_{1-5}-CH_2CH_2$ $OCOC(CH_3)=CH_2/CH_3OCOCH=CH_2$ of ratio 95/5 containing 23.5% solids.

The coating formulations contained polymer-solids and inorganic sol solids of 4/1, 2/1, 4/4, 1/2 and 1/4 of the total dispersion.

When tested on panels against road dirt, yard dirt and air cleaner test dirt, there was little accumulation compared to control panels. Water washing of coatings prepared from formulations containing low ratios of polymer to sol were shown to be less effective in providing clean surfaces after the panels were treated with road dirt.

EXAMPLE 8

In a similar manner to Example 7, coatings were prepared from 1% hexadecyl trimethylammonium bromide, 30% solids of aluminum modified silica positive sol and aqueous dispersion containing 20.9% of the copolymer of $F_3CCF_2-(CF_2CF_2)_{1-5}CH_2CH_2OCOCH=CH_2/CF_3CH_2OCH=CH_2$ as 90/10 ratio in formulations of ratios of copolymer to inorganic sol of 4/1, 2/1, 4/4, 1/2 and 1/4 of the total dispersion.

These were tested against road dirt on painted steel panels with the result that they were very effective compared to a control (6–8 rating compared to 0 for control).

EXAMPLE 9

A dispersion containing 4% polymer solids and 4% sol solids by weight was prepared by mixing 54.07 g of distilled water, 10 g of 1% hexadecyl trimethylammonium bromide, 22.7 g of polymer dispersion "U" and 13.34 g of Ludox 130M.

This was coated on 2 × 3 inches Lucite finished autobody panel to give clear and glossy panels which, with others, was attached to a frame in front of a car bumper and driven for several weeks. Road dusts pickup was considerably less than for a control with no coating.

Large Scale Tests

Statistical Evaluation

An overall rating including both dry dust repellency and dried dirt slurry removal was obtained by listing in order the top ten coatings in each of seven evaluations with their respective ratings. Overall ratings were determined adding all rating points of a coating in the various tests (coating applied by wiping or by sponge followed by air drying and optionally baking prior to exposure to road dirt or a synthetic dirt and washing). In this way an overall rating was obtained not only for each individual coating but also for each group of coatings based on a particular polymer-sol combination.

Using the above method the formulation of 1% polymer "U"/2% alumina sol ranked highest with an overall total of 36, while this polymer-sol at 4/1, 2/1, 1/2, 1/4 and 4/4 combinations in the five ratios examined totaled 116 out of a possible total of 350. The second and third ranking combinations were polymer "Q" with alumina sol giving a total of 103 and the polymer of Example 7 giving a total of 82. In contrast, coatings from formulations of methyl methacrylate/methacrylic acid (94/6) with silica sol gave only two coatings in the top ten and totaled only 16 while a formulation of polytetrafluoroethylene/silica sol under the same conditions gave only one coating in the top 10 and a total for all of 9.

EXAMPLE 10

Antisoil Coatings for Carpets

A dispersion prepared by diluting 60 ml of polymer dispersion (Example "E") to 500 ml with distilled water was used to saturate a 8 × 10 inch section of Du Pont 501 nylon carpet. The excess dispersion was drained and the treated carpet ("I") dried at 24–26°C followed by curing at 160°C for 15 min. in an air circulating oven.

To a dispersion prepared by diluting 60 ml of polymer dispersion (as above) to 500 ml with distilled water was added with mixing 16 g of Ludox 130M, 30% solids. Another 8 × 10 inch section from the same carpet was treated with this dispersion ("II") using the same method as above, while an untreated carpet section ("III") was used as a control.

The carpet samples were placed side by side in entrance hallway in a home. After 28 days' exposure, very little dirt had been picked up by any of the samples and the carpet samples were moved to the kitchen and placed in front of a counter between the sink and stove. Samples were vacuumed whenever the rest of carpeted kitchen was cleaned. After 60 days the carpet sections were taken up and evaluated.

There was little grease spotting on "I". It was slightly dirtier than "II" which was much less dirty and had less grease spotting than "III". The latter had considerable grease spotting and dirt in fabric.

Therefore, the antisoil coating composed of HIM/MAA copolymer was a good coating for lowering dirt adherence to carpet. The combination of HIM/MAA and Positive Sol 130M was even more effective in preventing soiling of nylon carpet.

EXAMPLE 11

In a manner similar to Example 7 coatings were prepared from 1% sodium lauryl sulfate, 30% solids silica sol (Ludox AS), and aqueous dispersion containing 16.3% of the terpolymer of $(CF_3)_2CHO_2CC(CH_3)=CH_2$, $CH_3O_2CC(CH_3)=CH_2$, and $HO_2CC(CH_3)=CH_2$ as 15/80/5 ratio in formulations of terpolymer to inorganic sol of 4/1, 2/1, 1/2, 1/4 and 4/4 of the total dispersion. These were tested against road dirt on painted steel panels with the result that they were very effective compared to a control (9 rating compared to 0 for control).

EXAMPLE 12

In a manner similar to Example 7, coatings were prepared from 1% hexadecyl pyridinium chloride, 30% solids Ludox 130M, and aqueous dispersion containing 18.2% of the copolymer $CF_3OCF=CF_2/CF_2=CF_2$ as a 22/78 mole ratio in formulations of copolymer to inorganic sol of 4/1, 2/1, 1/2, 1/4 and 4/4 of the total dispersion. These were tested against road dirt on painted steel panels with the result that they were very effective compared to a control (5–9 rating compared to 0–3 for control).

EXAMPLE 13

In a manner similar to Example 7, coatings were prepared from 1% hexadecyl pyridinium chloride, 30% solids Ludox 130M, and aqueous dispersion containing 12.4% of the polymer of $CF_3(CF_2)_7CH_2CH_2O_2C(CH_3)=CH_2$ in formulations of polymer to inorganic sol of 4/1, 2/1, 1/2, 1/4 and 4/4 of the total dispersion. These were tested against road dirt on painted steel panels with the result that they were very effective compared to a control (7–9 rating compared to 0 for control).

The embodiments of this invention in which a special property or privilege is claimed are defined as follows:

1. An aqueous dispersion containing a dispersant and 0.5% to 50% by weight of solid particles having a size less than 1μ, said particles consisting essentially of
   a. 4 parts by weight of hydrous metal oxide particles,
   b. from 1 to 16 parts by weight of polymer particles containing —$CF_3$ groups in an amount of from 0.5% to 92% by weight of said polymer, said polymer being a polymer of acrylic or methacrylic acid esterified with a fluorinated alcohol containing 2 to 12 carbon atoms and 1 to 3 —$CF_3$ groups, and having a Knoop hardness in bulk of at least 5.

2. Composition of claim 1 wherein said hydrous metal oxide is selected from the group consisting of silica, alumina and aluminum-modified silica.

3. Composition of claim 2 wherein said polymer contains from about 3% to about 60% by weight of —$CF_3$ groups.

4. Composition of claim 3 wherein said polymer is a polymer of 1,1,1,3,3,3-hexafluoroisopropyl methyl methacrylate.

5. Composition of claim 4 wherein said polymer is a homopolymer.

6. Composition of claim 3 wherein said polymer is a polymer of 2,2,2-trifluorethyl methacrylate.

7. Composition of claim 3 wherein said polymer is a polymer of a monomer $CF_3CF_2(CF_2CF_2)_nCH_2CH_2OCOC(CH_3)=CH_2$ wherein $n$ is from 1 to 5.

8. Composition of claim 7 wherein $n$ is 3.

* * * * *